T. A. WEBER.
Assignor to J. H. WOODMAN.
BOTTLE-STOPPER.
Reissued Oct. 3, 1876.
No. 7,335.
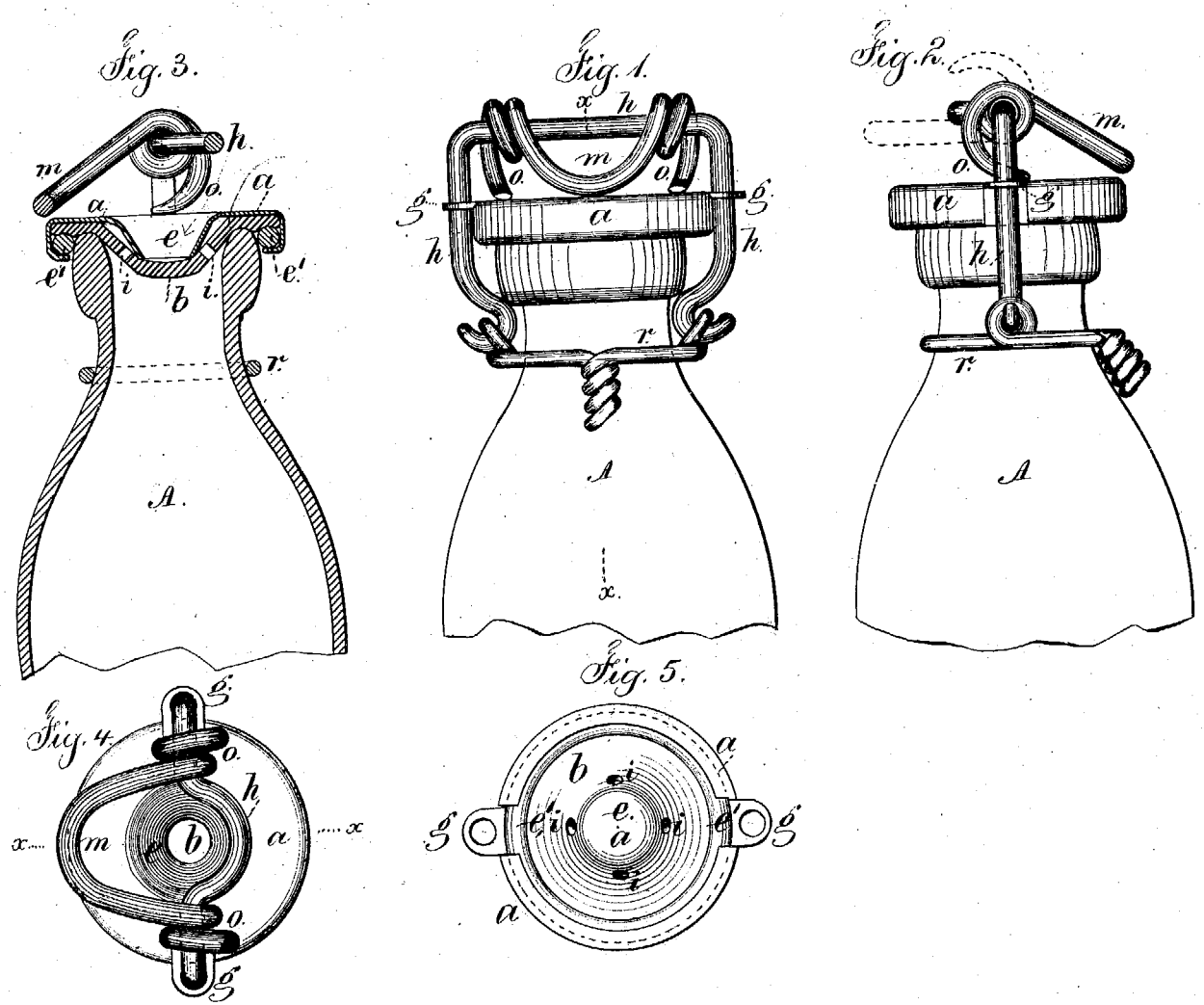
Witnesses
Chas. H. Smith
Harold Serrell
Inventor
Theodore A. Weber.
per Lemuel W. Serrell Atty.
THE NORRIS PETERS CO., PHOTO-LITHO., WASHINGTON, D. C.

UNITED STATES PATENT OFFICE.

THEODORE A. WEBER, OF NEW YORK, N. Y., ASSIGNOR TO JOSEPH H. WOODMAN.

IMPROVEMENT IN BOTTLE-STOPPERS.

Specification forming part of Letters Patent No. 66,270, dated July 2, 1867; reissue No. 7,335, dated October 3, 1876; application filed July 17, 1876.

*To all whom it may concern:*

Be it known that I, THEODORE A. WEBER, of the city and State of New York, have invented an Improvement in Bottle-Stoppers, of which the following is a specification:

I make use of a disk of elastic material, such as rubber, of a size sufficient to cover the end of the bottle, and employ a plate to press the same upon the mouth of the bottle, which plate has a downward central projection that serves to force the rubber against the inner surface of the mouth of the bottle; and I make this downward projection hollow, so as to be adapted to receive the end of a filling-tube that is used to force the liquid into the bottle through perforations in the rubber disk.

I combine with the rubber disk and metal plate a compressing-lever and bail, to force the rubber to the mouth of the bottle, and a neck-band is employed to attach the parts to the bottle. The lever is a cam-acting lever, made so as to pass beyond the plane through the axis of the lever, so that the pressure cannot throw the lever back, or liberate the stopper.

In the drawing, Figure 1 is an elevation of the stopper. Fig. 2 is a side view of the same. Fig. 3 is a vertical section at the line *x x*. Fig. 4 is a plan, and Fig. 5 is a plan, of the metal stopper-plate.

A portion of a bottle is shown at A. The elastic disk *b* is of india-rubber, connected with the metal stopper-plate *a*, and there is a central downward projection, *e*, to the metal stopper-plate *a*, that serves to make the india-rubber disk *b* press against the inner portion of the mouth when the flat portion of the plate *a* presses the rubber stopper to the mouth of the bottle. The neck-band *r*, bail *h*, and lever *m o* are shown as the means employed to press the rubber stopper to the end of the bottle. The ends of the bail *h* are turned up as hooks, that pass through the eyes upon the neck-band *r*, as heretofore employed in bails used with corks; but the bail *h* becomes the fulcrum for the lever *m o*. The cam-acting lever *m o* is shown of bent wire, the portions *o* being in the form of cams or segments of eccentrics, so that the stopper is pressed to its place by the movement of the lever.

The bail *h* is bent into a U form in the middle, (see Figs. 3 and 4,) so as to allow of the introduction of a tube for filling the bottle after the stopper is secured in place. When this is done, pressure of the liquid forces down the rubber *b* sufficiently to allow such liquid to pass between the stopper-plate *a* and rubber disk *b*, and through the holes at *i*.

When the filling-tube is removed, the pressure of the contents of the bottle causes the rubber disk *b* to set firmly and tightly against the part *e* of the plate *a*.

The filling-tube should have a conical rubber end, to fit tightly the recess in the metal stopper-plate, and it may have lateral discharge-openings to allow the liquid to more easily pass by the holes *i* into the bottle.

I have shown upon the stopper-plate *a* projecting lugs *g*, through which the bail *h* passes, and the edges of the rubber disk *b* are confined within the metal stopper-plate by the wire ring *e'*, over which the edges of said stopper-plate are turned.

I claim as my invention—

1. The combination, in a bottle-stopper, of an elastic disk and a metal plate, having a downward central projection, substantially as set forth.

2. The combination, in a bottle-stopper, of a metal plate having a downward central projection, an elastic disk, a compressing-lever, and a bail, substantially as set forth.

3. The combination, in a bottle-stopper, of an elastic stopper, a metal plate with a central opening, a neck-band, and means for connecting the neck-band and plate and compressing the elastic stopper, substantially as specified.

4. The combination, in a bottle-stopper, of a cam-acting lever, a metal disk, an elastic disk, and a yoke-wire, forming the fulcrum for the cam-acting lever, substantially as set forth.

5. The combination, in a bottle-stopper, of the cap *a* and elastic perforated diaphragm

*b*, substantially as and for the purposes described.

6. The combination, in a bottle-stopper, of a perforated cap, *a*, perforated diaphragm *b* ring *e'*, and mechanism, substantially as described, for holding the same tightly upon a bottle, substantially as described.

Signed by me this 13th day of July, A. D. 1876.

THEODORE A. WEBER.

Witnesses:
GEO. D. WALKER,
GEO. T. PINCKNEY.